Patented Jan. 9, 1923.

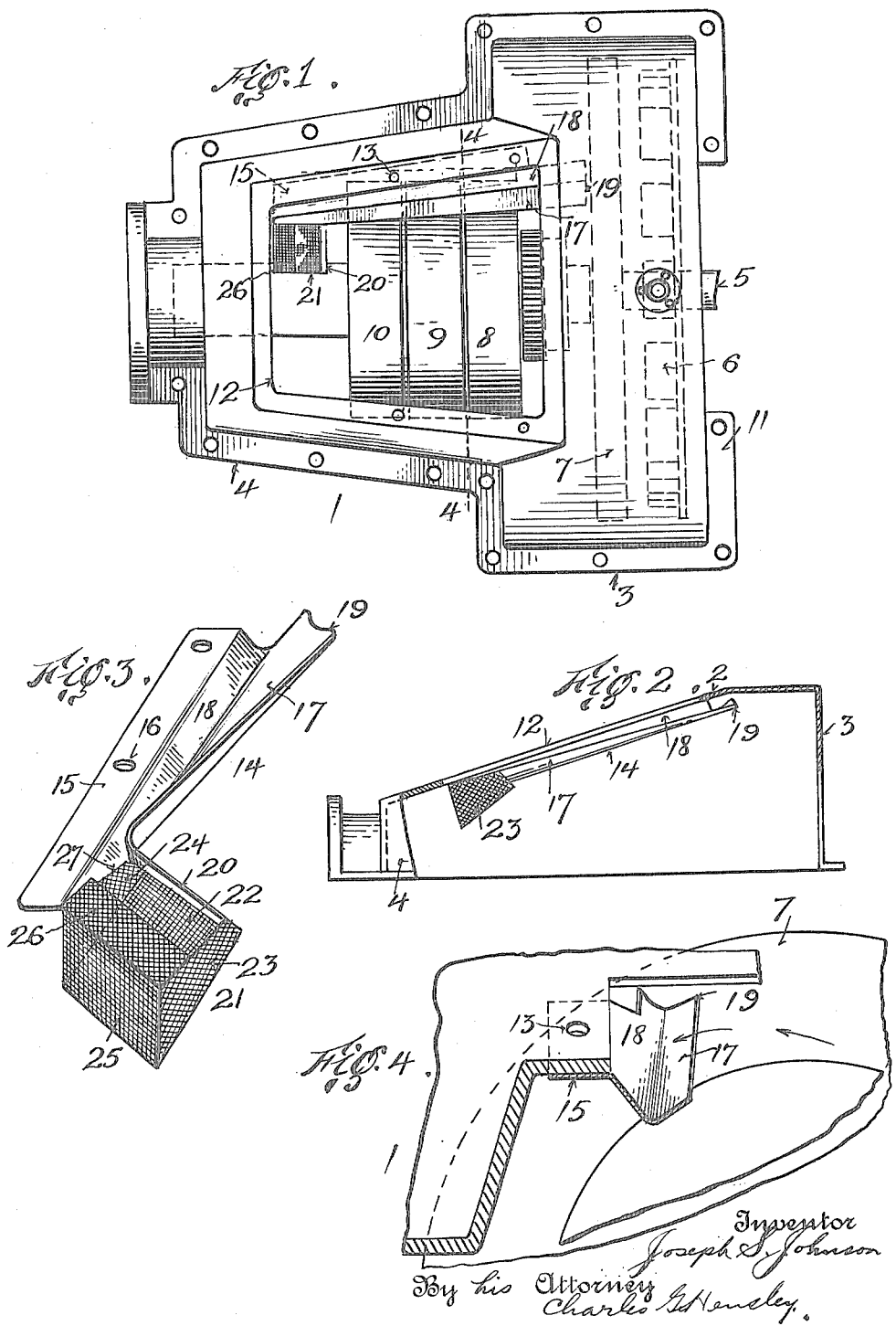

1,441,857

UNITED STATES PATENT OFFICE.

JOSEPH S. JOHNSON, OF JAMAICA, NEW YORK.

OIL STRAINER FOR AUTOMOBILE ENGINES.

Application filed February 24, 1920, Serial No. 360,806. Renewed August 23, 1922. Serial No. 583,938.

*To all whom it may concern:*

Be it known that I, JOSEPH S. JOHNSON, a citizen of the United States, and a resident of Jamaica, in the county of Queens and State of New York, have invented certain new and useful Oil Strainers for Automobile Engines, of which the following is a specification.

The present invention relates to a simple device for automatically and continuously straining the lubricating oil in automobile transmission casings for the purpose of capturing or holding all foreign substances contained in the oil whereby such substances will not continue to circulate through or around the parts in the transmission casing and motor. In certain automobiles and especially the "Ford," fabric linings are used on the several clutches in the transmission casing and as these linings wear, small particles of cotton work loose from the fabric and mix with the lubricating oil in the transmission casing. Some times friction in the clutches causes some of the fabric lining to be charred or partly burned, forming carbon which works free and mixes with the lubricating oil in the casing. These substances, and any others entering the lubricating oil of the transmission casing, are obviously objectionable and interfere with lubrication as well as with the proper operation of the parts contained in the casing. My object is to provide a very simple device for automatically straining or capturing and holding all foreign substances in the lubricating oil. The device is adapted to be easily attached to the transmission casing without modification of the latter, and in the preferred construction the device is clamped with the cover of the casing so that the same bolts which secure the cover serve to secure my device in place; and whenever the cover is removed the straining device may be readily removed and the accumulated substances may be removed therefrom.

In the drawing forming part of this application,

Figure 1 is a plan view of the transmission casing of a "Ford" automobile, with the cap over the drums removed to show the straining device in place, Figure 2 is a side elevation thereof, partly in section, but with the transmission mechanism omitted, Figure 3 is a perspective view of the strainer removed, and Figure 4 is a fragmentary view showing how the fly wheel throws the oil onto the straining device.

In the drawings I have shown the transmission casing 1 of a "Ford" automobile for the purpose of illustrating one application of my invention though it is to be understood that the invention is adapted to be used in other automobiles.

This transmission casing is inclined from the horizontal, or at least the top 2 thereof is so inclined. This casing comprises the wider forward portion 3 and the narrower rear portion 4. The portion 3 receives the engine shaft 5 and it contains the armature 6 of the magneto, as well as the combined fly wheel and field magnets 7 of the engine which is mounted on the shaft 5.

The rear portion 4 of the casing generally contains the reverse drum 8, the low speed drum 9 and the brake drum 10. There is a dome cover 11 fitting over the entire casing 1 and there is a removable cover or cap for closing the opening 12 but this cover is removed in the drawings for illustration purposes. This cover is adapted to be clamped in place by bolts passing through apertures 13 and these same bolts secure the strainer in place.

Lubrication for the mechanism is contained within the casing 1 and circulation is effected by the fly wheel 7 throwing the oil from the forward portion of the casing rearwardly.

In the preferred form of my invention there is a trough 14 having a flange 15 along one side which is placed on the packing along one side of the opening 12, so that when the cover is applied to the opening 12 and bolted down the flange 15 will be clamped between the rim of the cover and the packing and casing 1. The apertures 16 in the flange 15 are adapted to receive through them the bolts which secure the removable cover.

The trough 14 hangs down below the level of the flange 15 so that it lies under the cover which closes the opening 12 and the trough is preferably, though not necessarily open at the top and its sides 17, 18 incline to a V shape as shown. The forward end 19 of this trough projects into the forward part 3 of the casing 1 and it is positioned near the fly wheel 7 so that the oil carried up by the latter will be thrown on this end of the trough, somewhat as shown in Figure 4. As the trough inclines downwardly toward its rear end, the oil thrown upon the end 19 will be conducted by the trough 14 past the several drums 8, 9, 10 to the rearward end of the casing 1. At this, lower, end of the trough I have arranged a lateral arm 20 which supports a basket or strainer 21 preferably made of fine mesh wire fabric. It consists, in the form shown, of a slanting bottom 22, side walls 23, 24, end wall 25 and a top 26 which only partially closes the top of the basket. The oil which travels down the trough 14 passes laterally out at 27 and into the basket. In passing through the latter the oil is strained and any foreign substances contained therein are captured and held in the basket. As the oil is continually circulated in the manner described while the automobile is in operation it is continually being strained automatically as it circulates and foreign substances will remain but a short time in the lubricating oil.

The basket 21 will serve to hold all the substance which is likely to collect for a considerable period. Whenever the cover on the opening 12 is removed it is very easy to remove the strainer, shake the material out of the basket 21 and return the device in place. The present device not only serves to capture foreign substances in the lubricating oil but it also assists in directing the proper circulation of the oil in the transmission casing.

Having described my invention, what I claim is:

1. A device of the class described adapted to be placed in the transmission casing of an automobile, comprising a flange adapted to be clamped between the transmission casing and its removable cover, an inclined trough depending from said flange within said casing and having one end projecting adjacent the fly wheel in said casing whereby the oil thrown from said wheel will be received in said trough, and a basket adapted to receive the oil from the lower end of said trough and to separate foreign substances from the oil as the latter passes in circulation through the basket.

2. A device of the class described comprising a supporting flange, an inclined trough depending from said flange and a straining basket projecting laterally from one end of said trough for the purpose set forth, said basket having an inclined bottom, side walls, and a partial top closure 26.

Signed at the city, county and State of New York, this 22nd day of January, 1920.

JOSEPH S. JOHNSON.